(12) United States Patent
Yamamoto et al.

(10) Patent No.: US 9,497,476 B2
(45) Date of Patent: Nov. 15, 2016

(54) IMAGE DECODING APPARATUS

(71) Applicant: Sharp Kabushiki Kaisha, Osaka-shi, Osaka (JP)

(72) Inventors: Yoshiya Yamamoto, Osaka (JP); Tomohiro Ikai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/781,123

(22) PCT Filed: Apr. 7, 2014

(86) PCT No.: PCT/JP2014/060121
§ 371 (c)(1),
(2) Date: Sep. 29, 2015

(87) PCT Pub. No.: WO2014/163209
PCT Pub. Date: Oct. 9, 2014

(65) Prior Publication Data
US 2016/0057438 A1 Feb. 25, 2016

(30) Foreign Application Priority Data
Apr. 5, 2013 (JP) ................. 2013-079646

(51) Int. Cl.
| | |
|---|---|
| G06K 9/36 | (2006.01) |
| H04N 19/44 | (2014.01) |
| H04N 19/30 | (2014.01) |
| H04N 19/172 | (2014.01) |
| H04N 19/187 | (2014.01) |
| H04N 19/50 | (2014.01) |
| H04N 19/91 | (2014.01) |

(52) U.S. Cl.
CPC ............ *H04N 19/44* (2014.11); *H04N 19/172* (2014.11); *H04N 19/187* (2014.11); *H04N 19/30* (2014.11); *H04N 19/50* (2014.11); *H04N 19/91* (2014.11)

(58) Field of Classification Search
USPC .................... 382/233, 238, 239; 1/1; 73/633; 310/90.5; 375/240.16, E7.129; 600/437
See application file for complete search history.

(56) References Cited

U.S. PATENT DOCUMENTS

| | | | | |
|---|---|---|---|---|
| 5,844,140 A | * | 12/1998 | Seale ........................ | A61B 8/08 310/90.5 |
| 7,236,526 B1 | * | 6/2007 | Kitamura ................. | H04N 7/50 375/240.16 |
| 7,680,187 B2 | * | 3/2010 | Kitamura ................. | H04N 7/50 375/240.16 |

(Continued)

OTHER PUBLICATIONS

Official Communication issued in International Patent Application No. PCT/JP2014/060121, mailed on Jun. 28, 2014.

(Continued)

*Primary Examiner* — Anh Do
(74) *Attorney, Agent, or Firm* — Keating & Bennett, LLP

(57) ABSTRACT

An image decoding apparatus includes a unit configured to set an unreferenced region depending on whether information concerning a horizontal direction is defined, out of information indicating the unreferenced region. The image decoding apparatus further includes a unit configured to decode a flag that is to be set depending on whether a loop filter is related as information indicating the unreferenced region.

1 Claim, 8 Drawing Sheets

(56) References Cited

U.S. PATENT DOCUMENTS 8,681,868 B2 * 3/2014 Kitamura ............... H04N 7/50
375/240.16
9,185,439 B2 * 11/2015 Chen .................... G11B 27/034

OTHER PUBLICATIONS

Chen et al., "AHG7: Parallel Decoding SEI Message for MV-HEVC", JCT3V-O0062r1, Joint Collaborative Team on 3D Video Coding Extension Development of ITU-T SG 16 WP 3 and ISO/IEC JTC 1/SC 29/WG 11, Jan. 17-23, 2013, pp. 1-5.

Ikai et al., "AHG13: Parallel decoding SEI message", JCT3V-D0064r1, Joint Collaborative Team on 3D Video Coding Extensions of ITU-T SG 16 WP 3 and ISO/IEC JTC 1/SC 291WG 11, Apr. 20-26, 2013, pp. 1-6.

* cited by examiner

FIG. 3

| parallel_decoding_info( payloadSize ) { | Descriptor |
|---|---|
| video_parameter_set_id | ue(v) |
| pdi_offset_flag | u(1) |
| for( i = 1; i <= num_views_minus1; i++ ) { | |
| for( j = 0; j < num_direct_ref_layers[ i ]; j++ ) { | |
| pdi_unreferenced_region_ctu_vertical[ i ][ j ] | ue(v) |
| if (pdi_unreferenced_region_ctu_vertical) | |
| pdi_unreferenced_region_ctu_horizontal [ i ][ j ] | ue(v) |
| } | |
| } | |
| } | |

IMAGE DECODING APPARATUS

TECHNICAL FIELD

The present invention relates to an image decoding apparatus, an image coding apparatus, and a data structure.

BACKGROUND ART

The coding method of a moving image including multiple layers is typically called scalable coding or layer coding. The scalable coding performs prediction between layers, achieving a high coding efficiency. A layer free from the prediction between layers and serving as a reference layer is referred to as a base layer, and the other layers are referred to as enhanced layers. The scalable coding with a layer constructed of a view-point image is referred to as view scalable coding. In this case, the base layer is referred to as a base view, and the enhanced layer is referred to as a non-base view. Available besides the view scalable coding is the scalable coding with the layer constructed of a texture layer (image layer), and a depth layer (distance image layer) is referred to three-dimensional scalable coding.

In a case that the coding of a target layer (target view) and the coding of a reference layer (reference view) that is referenced by the target layer are performed, the reference region of a reference layered image that is referenced by the target layer needs to be limited. A technique (non-patent literature 1) is available in the related art to transfer the indication of limitation of parallel coding and a limited region (unreferenced region) as part of code data (parallel decoding information).

CITATION LIST

Non Patent Literature

NPL 1: Y. Chen, V. Seregin, A.-K. Ramasubramonian, L. Zhang, Y.-K. Wang, "AHG7: Parallel decoding SEI message for MV-HEVC", JCT3V-C0062r1, JCT3V 3rd Meeting: Geneva, CH, 17-23 Jan. 2013

SUMMARY OF INVENTION

Technical Problem

According to NPL 1, since the unreferenced region is determined by CTB unit as a coding block unit, the unreferenced region varies with the CTB size varying. To incorporate the unreferenced region, a coding apparatus needs to limit a region of parallax vector to a region where the unreferenced region is not referenced. For this reason, the region of the parallax vector is not clear. Since the unreferenced region is defined only in a case that the unreferenced region is limited concurrently both in a vertical direction and in a horizontal direction, it is difficult to define the unreferenced region in the vertical direction only. If a target view is not loop-filtered, ultra low latency decoding is possible to decode the target view faster. Since the reference region is limited based on the assumption that the target view is loop-filtered, such ultra low latency decoding is difficult.

Solution to Problem

The present invention has been developed to address the above-described problem. In one aspect of the present invention, an image decoding apparatus decoding a plurality of layered images, includes an entropy decoder that defines an unreferenced region of a second layered image in a case that the second layered image, different from a first layered image, is referenced during decoding of the first layered image. The unreferenced region to be decoded by the entropy decoder is defined as being based on an offset in a vertical direction only.

In another aspect of the present invention, an image decoding apparatus decoding a plurality of layered images, includes an entropy decoder that defines a referenced region of a second layered image in a case that the second layered image, different from a first layered image, is referenced during decoding of the first layered image. The entropy decoder selects between the unreferenced region defined by a vertical direction only and the unreferenced region defined by offsets in the vertical direction and horizontal direction.

Advantageous Effects of Invention

According to the present invention, the unreferenced region is easily determined since the unreferenced region transmitted in parallel decoding information depends on a coding parameter of a target view. Ultra low latency decode becomes possible because an offset corresponding to the presence or absence of a loop filter in the target view is coded as offset information of parallel decoding information.

BRIEF DESCRIPTION OF DRAWINGS

FIG. 3 diagrammatically illustrates the structure of code data of parallel decoding information to be decoded by an SEI decoder of the embodiment.

DESCRIPTION OF EMBODIMENTS

First Embodiment

An embodiment of the present invention is described below with reference to the drawings.

Figure 1:
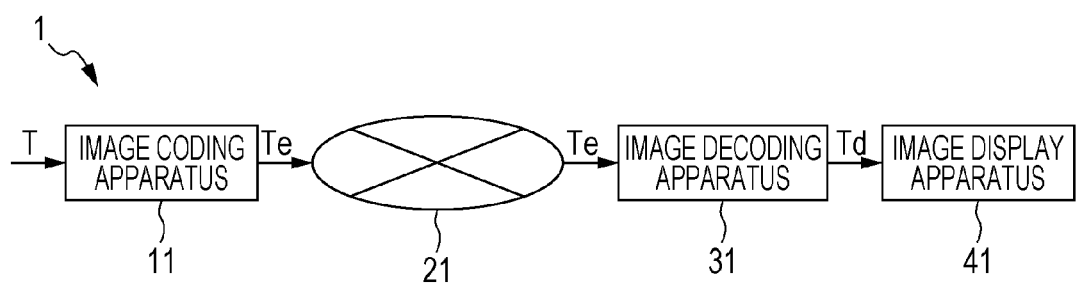
FIG. 1 is a block diagram diagrammatically illustrating an image transmission system of an embodiment of the present invention.

FIG. 1 is a block diagram diagrammatically illustrating an image transmission system 1 of the embodiment of the present invention.

The image transmission system 1 transmits codes into which images of multiple layers are coded, and displays an image decoded from the transmitted codes. The image transmission system 1 includes an image coding apparatus 11, a network 21, an image decoding apparatus 31, and an image display apparatus 41.

The image coding apparatus 11 receives a signal T indicating multiple layered images (also referred to as texture images). The layered image is an image that is viewed or photographed at a given resolution or at a given view point. In a case that view scalable coding is performed to code a three-dimensional image using multiple layered images, each of the multiple layered images is referred to as a view-point image. The view point refers to the location or the observation point of an imaging apparatus. For example, the multiple view-point images are images that are photographed by right and left imaging apparatuses with respect to a subject. The image coding apparatus 11 codes each of the signals from the imaging apparatuses to generate code stream Te (code data). The code stream Te is described in detail below. The view-point image is a two-dimensional image (planar image) observed at a given view point. The view-point image is represented by the luminance value or a color signal value at each pixel located in a two-dimensional plane. In the discussion that follows, a single view-point image or a signal indicating that view-point image is referred to as a picture. In a case that the space scalable coding is performed using multiple layered images, the multiple layered images include a base layered image at a low resolution, and an enhanced layered image at a high resolution. In a case that SNR scalable coding is performed using multiple layered images, the multiple layered images include a base layered image at a low image quality, and an enhanced layered image at a high image quality. The view scalable coding, the space scalable coding, and the SNR scalable coding may be performed in any combination. In the embodiment, the images, including at least a base layered image, and an image other than the base layered image (an enhanced layered image) as the multiple layered images, are encoded and decoded. The multiple layers may include two layers in which images thereof or coding parameters thereof are in a reference relationship (dependent relationship), and an image to be referenced is referred to as a first layered image, and an image that references that image is referred to as a second layered image. For example, an enhanced layered image (other than the base layer) may be encoded by referencing the base layer. In such a case, the base layered image is handled as the first layered image while the enhanced layered image is handled as the second layered image. For example, the enhanced layered image may be an image at a view point other than the base view, or a depth image.

The network 21 transmits a code stream Te generated by the image coding apparatus 11 to the image decoding apparatus 31. The network 21 may be the Internet, a wide-area network (WAN), a local-area network (LAN), or a combination thereof. The network 21 is not necessarily limited to a two-way communication network, and may also be a one-way communication network to transmit a broadcasting wave, such as terrestrial digital broadcasting wave or satellite broadcasting wave. The network 21 may be substituted for by a storage medium, storing the code stream Te, such as DVD (Digital Versatile Disc) or BD (Blue-ray Disc).

The image decoding apparatus 31 decodes each code stream Te transmitted via the network 21, and generates decoded multiple layered images Td (decoded view-point images Td).

The image display apparatus 41 displays the whole or part of the multiple decoded layered images Td generated by the image decoding apparatus 31. If the whole of the multiple decoded layered images Td is displayed in the view scalable coding, a three-dimensional image (stereoscopic image) or a free view-point image is displayed. In the case of the part of the multiple decoded layered images Td, a two-dimensional image is displayed. The image display apparatus 41 may include a display device, such as a liquid-crystal display or an organic EL (Electro-luminescence) display. If the image decoding apparatus 31 and the image display apparatus 41 have higher throughputs in the space scalable coding or the SNR scalable coding, an extended layered image at a higher image quality is displayed. If the image decoding apparatus 31 and the image display apparatus 41 have lower throughputs, a base layered image, which involves a throughput and a display capability not as high as those in the enhanced layer, is displayed.

<Structure of Code Stream Te>

The data structure of the code stream Te generated by the image coding apparatus 11 and decoded by the image decoding apparatus 31 is described prior to the detailed discussion of the image coding apparatus 11 and the image decoding apparatus 31 of the embodiment.

Figure 2:
FIG. 2 illustrates a layer structure of data of a code stream of the embodiment.
Figure 2:
Figure 2:
Figure 2:
Figure 2:
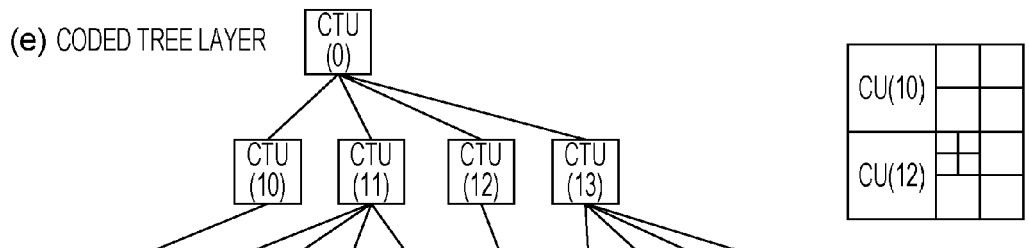
Figure 2:
Figure 2:
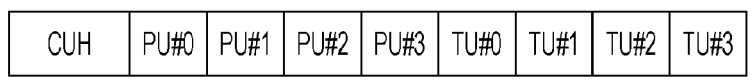

FIG. 2 illustrates a layer structure of data of the code stream Te of the embodiment. The code stream Te includes a sequence, and multiple pictures forming the sequence, for example. FIG. 2(a) through FIG. 2(f) respectively illustrate a sequence layer that defines a sequence SEQ, a picture layer that defines a picture PICT, a slice layer that defines a slice S, a slice data layer that defines slice data, a coded tree layer that defines a coded tree unit included in the slice data, and a coded unit layer that defines a coded unit (CU) included in the coded tree.

(Sequence Layer)

In the sequence layer, a set of data that the image decoding apparatus 31 references to decode the sequence SEQ (hereinafter also referred to as a target sequence) is defined. Referring to FIG. 2(a), the sequence SEQ includes a video parameter set, a sequence parameter set SPS, a picture parameter set PPS, supplemental enhancement information SEI, and a picture PICT. A value following symbol # indicates layer ID. FIG. 2 illustrates an example where code data of #0 and #1, namely, layer 0 and layer 1 is present. The types of layer and the number of layers are not limited to those illustrated herein.

In a moving image constructed of multiple layers, the video parameter set VPS defines a set of coding parameters common to multiple moving images, multiple layers included in the moving images, and a set of coding parameters related to individual layers.

The sequence parameter set SPS defines a set of coding parameters that the image decoding apparatus 31 references to decode the target sequence. For example, the width and height of a picture are defined herein.

The picture parameter set PPS defines a set of coding parameters that the image decoding apparatus 31 references to decode each picture in the target sequence. For example, the picture parameter set PPS includes a reference value of quantization width (pic_init_qp_minus26) for use in decoding the picture, and a flag (weighted_pred_flag) indicating the application of weighed prediction. Multiple PPS sets may be used. In such a case, one of the PPSs is selected from each picture in the target sequence.

The supplemental enhancement information SEI defines a set of information to control the decoding of the target sequence. Parallel decoding information enabling parallel decoding is one piece of SEI.

(Parallel Decoding Information)

FIG. 3 diagrammatically illustrates the structure of code data of the parallel decoding information.

Here, pdi_unreferenced_region_ctu_horizontal[i][j] and pdi_unreferenced_region_ctu_vertical[i][j] are syntax elements to indicate the unreferenced region. pdi_unreferenced_region_ctu_horizontal[i][j] is an offset in the horizontal direction indicating the unreferenced region in a case that a target view i (first layer) references a reference view j (second layer), and pdi_unreferenced_region_ctu_vertical[i][j] is an offset in the vertical direction indicating the unreferenced region in a case that the target view i references the reference view j. The offset in the horizontal direction and the offset in the vertical direction respectively indicate offsets with respect to the top left reference CTB in the unreferenced region of the reference view j in a case that the target CTB of the target view i is decoded. Units of offset are in CTB units. A delay from the completion of the decoding of the reference CTB of the reference view j until the target view i is decodable may be defined as being indicated by the offset between the target CTB and the reference CTB. pdi_offset_flag is a syntax element (adjustment flag) to adjust the unreferenced region. If the target view is loop-filtered (with a deblocking filter, SAO and a interpolation filter), pdi_offset_flag is set to be 1, and if the target view is not loop-filtered, pdi_offset_flag is set to be 0. If PdiOffsetVal is fixed to 0 as described below, the encode data may be configured not to include the adjustment flag. In such a case, the adjustment of the unreferenced region corresponding to the presence or absence of the loop filter is difficult.

(Unreferenced Region)

Unreferenced region [i][j] is a region that is not to be treated as a reference region in a case that a given target view i references a reference view j.

FIG. 4(a) through FIG. 4(c) illustrate a first unreferenced region, a second unreferenced region, and an unreferenced region [i][j]. The unreferenced region includes the first unreferenced region only, or both the first unreferenced region and the second unreferenced region. If the first unreferenced region and the second unreferenced region are defined, the unreferenced region becomes the sum of the first unreferenced region and the second unreferenced region. The first unreferenced region may overlap the second unreferenced region. If none of the second unreferenced region and the second unreferenced region is defined, there is no unreferenced region. In other words, all regions may be referenced.

The first unreferenced region is defined in a case that the syntax element pdi_unreferenced_region_ctu_vertical as the offset in the vertical direction of the parallel decoding information is greater than 0. In a case that pdi_unreferenced_region_ctu_vertical is 0, the first unreferenced region is not defined. The offset in the vertical direction pdi_unreferenced_region_ctu_vertical indicates the unreferenced region in the vertical direction of the first unreferenced region. The first unreferenced region is an area of a rectangular shape defined by $x$Unref=0..pic_width_in_luma_samples−1, $y$Unref=$y$Ctb+(pdi_unreferenced_region_ctu_vertical[i][j]*CtbSizeY)−PdiOffsetVal..pic_height_in_luma_samples−1.

More specifically, the first unreferenced region is a rectangular region defined by the offset in the vertical direction pdi_unreferenced_region_ctu_vertical[i][j]. Y coordinate at the top left coordinates of the first unreferenced region is a value that results from multiplying the sum of Y coordinate yCtb of the CTB coordinates of the target block and the offset in the vertical direction by the CTB size CtbSizeY. The X coordinate of the top left coordinates is 0, and the bottom right coordinates of the unreferenced region is the bottom right of screen.

Note that xUnref=x_min . . . x_max indicates that the x coordinate ranges from x_min to x_max, and that yUnref=y_min . . . y_max indicates that the y coordinate ranges from y_min to y_max. The rectangular region is defined by the X coordinate and Y coordinate (The same is true of the following discussion).

pic_width_in_luma_samples indicates the horizontal width of a luminance component of the picture. pic_height_in_samples indicates the height of the luminance component of the picture. CtbAddrInRs indicates which CTB in the raster scan order is the target CTB in the picture. PicWidthInCtbsY is a value that results from dividing the height of the target view by the CTB size. CtbSizeY is the CTB size of the target view. PdiOffsetVal is an offset that is calculated by the following formula based on the value of the syntax element pdi_offset_flag indicating whether to perform an adjustment on the parallel decoding information with the loop filter.

PdiOffsetVal=pdi_offset_flag*8

PdiOffsetVal corresponds to a variation that occurs in the involved unreferenced region depending on whether the loop filter is applied to the reference view. If the deblocking filter and the adaptive offset filter (SAO) are used as a loop filter, an application region of the standard deblocking filter is 3 pixels, and an application region of the adaptive offset filter is 1 pixel. A total of 4 pixels are used. In a case that the adaptive offset filter is used in the reference view, the unreferenced region is to be expanded. For this reason, PdiOffsetVal is 4 with pdi-offset-flag set to 1, and PdiOffsetVal is 0 with pdi-offset-flag set to 0. If the loop filter is used in the reference view, the loop filter process of the horizontal border located at the bottom of CTB and of the vertical border located at the rightmost position of CTB involves waiting for the decoding of CTB at the next CTB line and the next CTB to the right of the current CTB. In other words, the delay caused by the waiting for the decoding increases in a case that the pixels near the borders are referenced. With the loop filter used in the reference view, these regions may be excluded to control the increase in the delay.

The second unreferenced region is defined in a case that the syntax element pdi-unreferenced_region_ctu_horizontal as the offset in the horizontal direction of the parallel decoding information is greater than 0. With pdi-unreferenced_region_ctu_horizontal being 0, the second unreferenced region is not defined. The horizontal offset pdi-unreferenced_region_ctu_horizontal indicates a limited region in the horizontal direction of the second unreferenced region. The second unreferenced region is a rectangular region defined by $x$Unref=$x$Ctb+(pdi_unreferenced_region_ctu_horizontal[i][j]*CtbSizeY)−PdiOffsetVal..pic_width_in_luma_samples−1

$y$Unref=$y$Ctb+((pdi_unreferenced_region_ctu_vertical[i][j]−1)*CtbSizeY)−PdiOffsetVal..pic_height_in_luma_samples−1

More specifically, the second unreferenced region is a rectangular area defined by the vertical offset pdi_unrferenced_region_ctu_vertical[i][j] and the horizontal offset pdi_unrferenced_region_ctu_horizontal[i][j]. The Y coordinate of the top left coordinates of the second unreferenced region results from multiplying the CTB size CtbSizeY by a value that is obtained by subtracting 1 from the sum of the Y coordinate yCtb of the CTB coordinates of the target block and the vertical offset. The X coordinate of the top left coordinates of the second unreferenced region results from multiplying the CTB size CtbSizeY by the sum of the X coordinate xCtb of the CTB coordinates of the target block and the vertical offset.

Here, xCtb and yCtb respectively represent the X coordinate and the Y coordinate of the CTB including the target block on the target view, and are calculated in accordance with the following formulas based on the CTB address CtbAddrInRs of the target block, the screen size PicWidthInCtbsY dependent on the CTB size of the target view, and the CTB size CtbSizeY.

$xCtb = (CtbAddrInRs \% PicWidthInCtbsY) * CtbSizeY$ $yCtb = (CtbAddrInRs / PicWidthInCtbsY) * CtbSizeY$ (Modification of Unreferenced Region)

In a case that the adjustment flag of the loop filter is not transmitted as the parallel decoding information (in other words, PdiOffsetVal is fixed to 0), the unreferenced region may be defined by the CTB size CtbSizeY unit of the target view rather than by pixel unit. In a modification (second definition of the unreferenced region), the first unreferenced region is not defined with pdi_unreferenced_region_ctu_vertical being 0. In a case that pdi_unreferenced_region_ctu_vertical is greater than 0, the first unreferenced region is defined as described below.

$xUnrefCtb = 0 .. PicWidthInCtbsY-1$ $yUnrefCtb = CtbAddrY + pdi\_unreferenced\_region\_ctu\_vertical[i][j] .. PicHeightInCtbsY-1$ xUnrefCtb=x_min ... x_max indicates that the x coordinate of the CTB coordinates on the reference picture ranges from x_min to x_max. yUnrefCtb=y_min ... y_max indicates that the y coordinate of the CTB coordinates on the reference picture ranges from y_min to y_max. The range of each of the X coordinate and the Y coordinate is indicated, and is thus the rectangular region is defined (the same is true of the following discussion).

PicHeightInCtbsY is a value that results from dividing the CTB size by the screen height of the target view.

The second unreferenced region is not defined with pdi_unreferenced_region_ctu_horizontal being 0. In a case that pdi_unreferenced_region_ctu_horizontal is greater than 0, the second unreferenced region is defined as below.

$xUnrefCtb = CtbAddrX + pdi\_unreferenced\_region\_ctu\_horizontal[i][j] .. PicWidthInCtbsY-1$ $yUnrefCtb = CtbaAddrY + (pdi\_unreferenced\_region\_ctu\_vertical[i][j]-1) .. PicHeightInCtbY-1$ CtbAddrX and CtbAddrY respectively represent the CTB coordinate in the X direction and the CTB coordinate in the Y direction of the CTB including the target block on the target view. CtbAddrX and CtbAddrY are calculated in accordance with the following formulas based on the CTB address CtbAddreInRs of the target block and the screen size PicWidthInCtbsY dependent on the CTB size of the target view.

$CtbAddrX = CtbAddrInRs \% PicWidthInCtbsY$ $CtbAddrY = CtbAddrInRs / PicWidthInCtbsY$ (Picture Layer)

The picture layer defines a set of data that the image decoding apparatus 31 references to decode a picture PICT (hereinafter referred to as a target picture) as a process target. The picture PICT includes slices S0 through SNS-1 (NS represents a total number of slices included in the picture PICT) as illustrated in FIG. 2(b).

If the slices S0 through SNS-1 are not discriminated from each other, the suffix may be omitted. The same is true of the data included in the code stream Te to be discussed below if the data is introduced with a suffix.

(Slice Layer)

The slice layer defines a set of data that the image decoding apparatus 31 references to decode a slice S as a process target (also referred to as a target slice). The slice S includes a slice header SH, and slice data SDATA as illustrated in FIG. 2(c).

The slice header SH includes a coding parameter group that the image decoding apparatus 31 references to determine a decoding method of the target slice. Slice type specifying information (slice_type) specifying a slice type is an example of the coding parameter included in the slice header SH.

Slice types specified by the slice type specifying information include (1) I slice that uses intra-prediction only in coding, (2) P slice that one-way prediction or intra-prediction in coding, and (3) B slice that uses one-way prediction, two-way prediction, or intra-prediction in coding.

The slice header SH may include a reference (pic_parameter_set_id) to the picture parameter set PPS included in the sequence layer.

(Slice Data Layer)

The slice data layer defines a set of data that the image decoding apparatus 31 references to decode the slice data SDATA as a process target. Referring to FIG. 2(d), the slice data SDATA includes a coded tree block (CTB). The CTB is a block having a fixed size (such as 64×64) forming a slice, and may also be referred to as a largest coded unit (LCU).

(Coded Tree Layer)

As illustrated in FIG. 2(e), the coded tree layer defines a set of data that the image decoding apparatus 31 references to decode a coded tree block as a process target. A coded tree unit is partitioned using recursive quadtree partitioning. A node of a tree structure resulting from the recursive quadtree partitioning is referred to as a coded tree. An intermediate node of the quadtree is a coded tree unit (CTU), and a coded tree block itself is defined as CTU at the highest. The CTU includes a split flag (split_flag). With split_flag being 1, the coding tree is split into four coded tree units CTUs. With split_flag being 0, the coding tree is split into four coded units (CUs). The coded unit CU is a terminal node of the coded tree layer, and this layer is not split any more. The coded unit CU is a basic unit of a coding process.

With the coded tree block CTB having a size of 64×64 pixels, the coded unit may take one of the sizes 64×64 pixels, 32×32 pixels, 16×16 pixels, and 8×8 pixels.

(Coded Unit Layer)

As illustrated in FIG. 2(f), the coded unit layer defines a set of data that the image decoding apparatus 31 references to decode the coded unit as a process target. More specifically, the coded unit includes a CU header CUH, a prediction tree, a transform tree, and a CU header CUF. The CU header CUH determines whether the coded unit is to use intra-prediction or inter-prediction. The coded unit serves as a root of the prediction tree (PT) or the transform tree (TT). The CU header CUF is included between the prediction tree and the transform tree, or subsequent to the transform tree.

In the prediction tree, the coded unit is partitioned into at least one prediction block, and the location and size of each prediction block are defined. In other words, the prediction block is one or more areas forming the coded unit and not overlapping each other. The prediction tree includes one or more prediction blocks partitioned as described.

A prediction process is performed on each prediction block. In the discussion that follows, the prediction block is also referred to as a prediction unit (PU).

The type of partition in the prediction tree is generally two cases, namely, intra-prediction and inter-prediction. The intra-prediction is a prediction process performed within the same picture, and the inter-prediction is a prediction process performed between different pictures (for example, between display times, or between layered images).

In the intra-prediction, the partitioning method is 2N×2N (the same size as the coded unit), and N×N.

In the case of the inter-prediction, the partitioning method codes the code data through part_mode, and includes 2N×2N (the same size as the coded unit), 2N×N, 2N×nU, 2N×nD, N×2N, nL×2N, nR×2N, and N×N. 2N×nU indicates that the coded unit of 2N×2N is partitioned into two regions of 2N×0.5N and 2N×1.5N in the order from above. 2N×nD indicates that the coded unit of 2N×2N is partitioned into two regions of 2N×1.5 N and 2N×0.5 N in the order from above. nL×2N indicates that the coded unit of 2N×2N is partitioned into two regions of 0.5N×2N and 1.5N×2N in the order from above. nR×2N indicates that the coded unit of 2N×2N is partitioned into two regions of 1.5N×2N and 0.5N×1.5N. Since the number of partitioning is 1, 2, or 4, the number of PUs included in the CU ranges from 1 to 4. These PUs are sequentially represented by PU0, PU1, PU2, and PU3.

In the transform tree, the coded unit is partitioned into one or more transform blocks, and the location and size of each transform block are defined. In other words, the transform block is one or more regions forming the coded unit and not overlapping each other. The transform tree includes one or more transform blocks obtained through the partitioning.

The transform tree may be partitioned by assigning as a transform block a region having the same size as the coded unit or by performing the recursive quadtree partitioning in the same manner as in the tree block.

The transform process is performed on each transform block. The transform block is also referred to as a transform unit (TU).

(Prediction Parameter)

A prediction image of the prediction unit is derived from a prediction parameter incidental to the prediction unit. The prediction parameter includes a prediction parameter for the intra-prediction or a prediction parameter for the inter-prediction. The prediction parameter for the inter-prediction (inter-prediction parameter) is described below. The inter-prediction parameter includes prediction list use flags predFlagL0 and predFlag1, reference picture indexes refIdxL0 and refIdxL1, and vectors mvL0 and mvL1. The prediction list use flags predFlagL0 and predFlagL1 are flags indicating whether reference picture lists called L0 list and L1 list are used or not. With the value of the flag being 1, the corresponding reference picture list is used. In the context of the description, the statement reading "a flag indicating whether an item is XX" indicates that 1 indicates XX, and that 0 indicates not XX". In NOT operation or AND operation, 1 is treated as true, and 0 is treated as false (the same is true in the following discussion). In actual apparatuses and methods, other values may be treated as a true value and a false value. In the case of two reference pictures, more specifically, predFlagL0=1, and predFlagL1=1 correspond to bidirectional prediction. The use of a single reference picture list, namely, (predFlagL0, predFlagL1)=(1,0) or (predFlagL0, predFlagL1) (0, 1) correspond to unidirectional prediction. Information of the prediction list use flag may be expressed in an inter-prediction flag inter_pred_idx.

The prediction list use flag is typically used in a prediction image generator and a prediction parameter memory to be discussed below. The inter prediction flag inter_pred_idx is used to decode, from the code data, information indicating which reference picture list to use.

The syntax elements to derive the inter-prediction parameter included in the code data include a partition mode part_mode, merge flag merge_flag, merge index merge_idx, inter-prediction flag inter_pred_idx, reference picture index refIdxLX, prediction vector index mvp_LX_idx, and difference vector mvdLX.

(Example of Reference Picture List)

Figure 5:
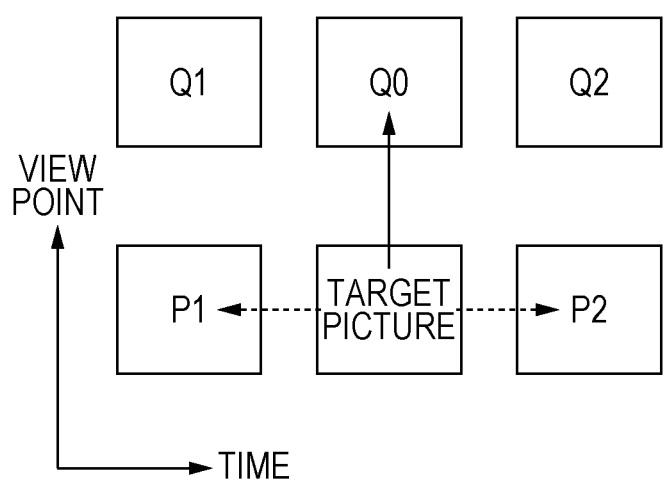
FIG. 5 illustrates the concept of an example of a reference picture.
Figure 6:
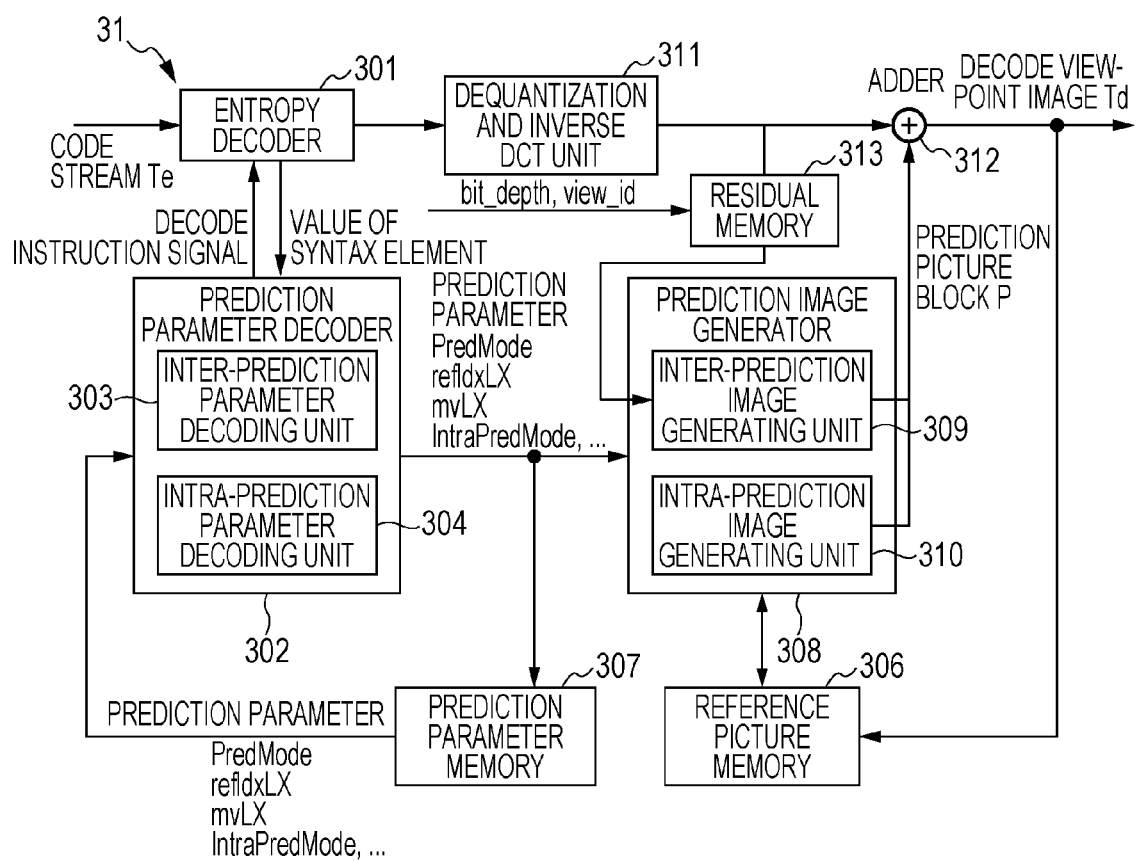
FIG. 6 diagrammatically illustrates the configuration of an image decoding apparatus of the embodiment.

An example of the reference picture list is described below. The reference picture list is a list of reference pictures stored on a reference picture memory 306 (FIG. 6). FIG. 5 illustrates the concept of an example of the reference picture list. A reference picture list 601, five rectangles arranged in a line from left to right respectively indicate reference pictures. Symbols P1, P2, Q0, P3, and P4 respectively represent reference pictures. P of P1 or the like represents a view point P, and Q of Q0 or the like represents a view point different from the view point P. The suffix of P and Q indicates a picture order number POC. An arrow looking downward right below refIdxLX indicates that the reference picture index refIdxLX is an index referencing the reference picture Q0 in the reference picture memory 306.

(Example of Reference Picture)

Figure 4:
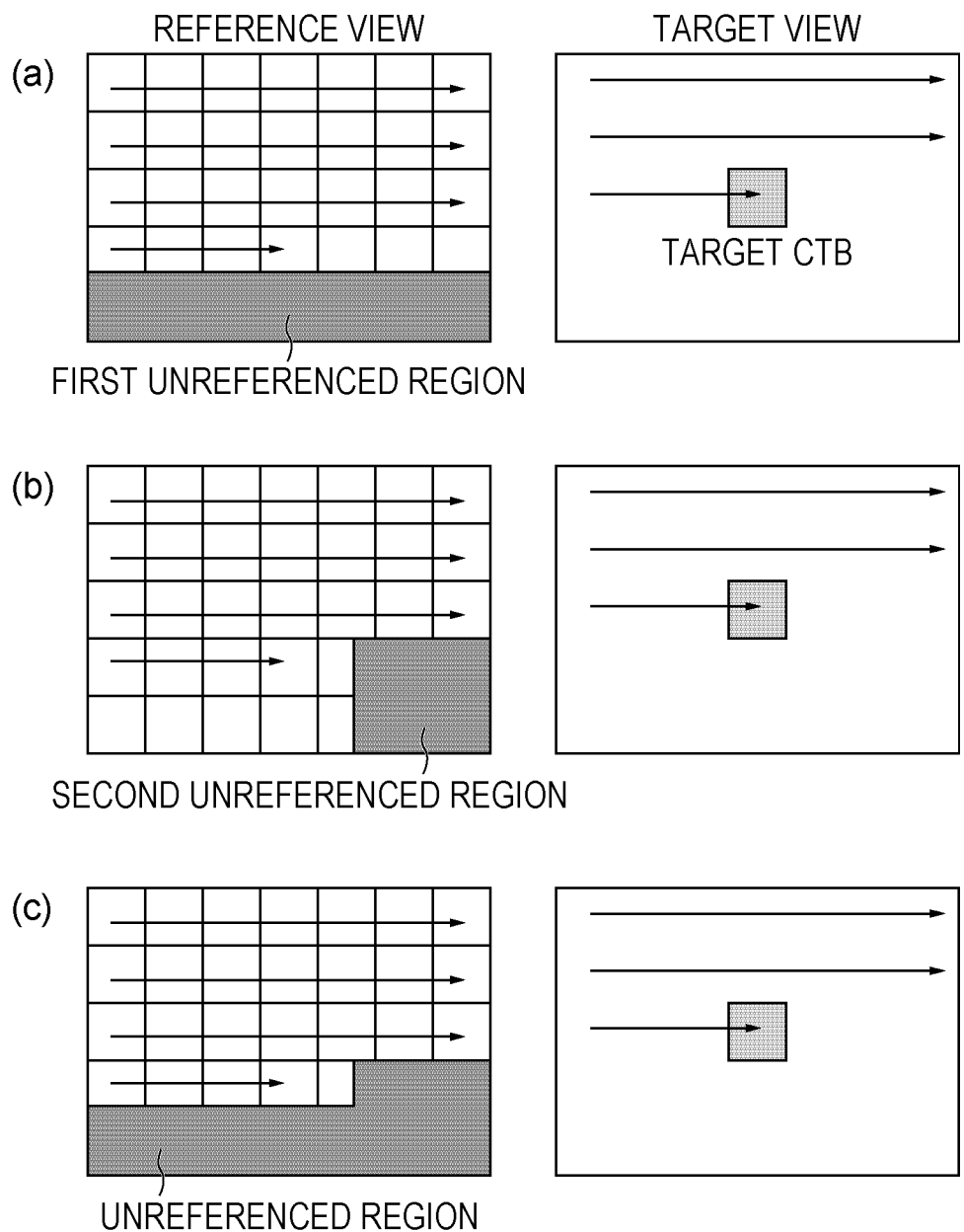
FIG. 4 illustrates the concept of a first unreferenced region, a second disabled region, and a referenced region of the embodiment.

An example of the reference picture for use in deriving a vector is described below. FIG. 4 illustrates the concept of the example of the reference picture. Referring to FIG. 4, the abscissa represents display time and the ordinate represent view point. As illustrated in FIG. 4, rectangles arranged in two rows in the vertical direction and three columns in the horizontal direction (a total of six rectangles) respectively represent the pictures. The rectangle at the lower row at the second column, of the six rectangles, indicates a picture as a decode target (target picture), and the remaining five rectangles respectively represent the reference pictures. The reference picture Q0 pointed to with an upward looking arrow from the target picture is at the same display time as but different in view point from the target picture. The reference picture Q0 is used in displacement prediction with respect to the target picture. The reference picture P1 pointed to with a left-ward looking arrow from the target picture is at the same view point as the target picture and a past picture. The reference picture P2 pointed to with a right-ward looking arrow from the target picture is at the same view point as the target picture and a future picture. Reference pictures P1 and P2 are used in the motion prediction with respect to the target picture.

(Configuration of Image Decoding Apparatus)

The image decoding apparatus 31 of the embodiment is described below. FIG. 6 illustrates the configuration of the image decoding apparatus 31 of the embodiment. The image decoding apparatus 31 includes an entropy decoder 301, a prediction parameter decoder 302, a reference picture memory (reference image storage unit and frame memory) 306, a prediction parameter memory (prediction parameter storage unit and frame memory) 307, a prediction image generator 308, a dequantization and inverse DCT unit 311, an adder 312, and a residual memory (residual recorder) 313.

The prediction parameter decoder 302 includes an inter-prediction parameter decoding unit 303 and an intra-prediction parameter decoding unit 304. The prediction image generator 308 includes an inter-prediction image generating unit 309 and an intra-prediction image generating unit 310.

The entropy decoder 301 separates and decodes individual codes (syntax elements) through entropy decoding on the code stream Te input from the outside. The separated codes include prediction information to generate a prediction image and residual information to generate a difference image.

The entropy decoder 301 outputs part of the separated codes to the prediction parameter decoder 302. The part of the separated codes includes a prediction mode PredMode, partition mode part_mode, merge flag merge_flag, merge index merge_idx, inter-prediction flag inter_pred_idx, reference picture index refIdxLX, prediction vector index mvp_LX_idx, and difference vector mvdLX. Control operation as to which code to decode is performed in response to an instruction from the prediction parameter decoder 302. The entropy decoder 301 outputs a quantization coefficient to the dequantization and inverse DCT unit 311. The quantization coefficient is obtained by performing DCT (Discrete Cosine Transform) on a residual signal in a decoding process and quantizing a resulting value.

The entropy decoder 301 includes an SEI decoding unit. The SEI decoding unit decodes SEI including the parallel decoding information defined in FIG. 3, and transfers the decoded SEI to the inter-prediction image generating unit 309.

In response to the code input from the entropy decoder 301, the inter-prediction parameter decoding unit 303 references the prediction parameter stored on the prediction parameter memory 307, and decodes the inter-prediction parameter.

The inter-prediction parameter decoding unit 303 outputs the decoded inter-prediction parameter to the prediction image generator 308, and stores the decoded inter-prediction parameter on the prediction parameter memory 307. The inter-prediction parameter decoding unit 303 is described in detail below.

In response to the code input from the entropy decoder 301, the intra-prediction parameter decoding unit 304 references the prediction parameter stored on the prediction parameter memory 307, and decodes the intra-prediction parameter. The intra-prediction parameter is a parameter for use in a process to predict a picture block in one picture, and is an intra-prediction mode IntraPredMode, for example. The intra-prediction parameter decoding unit 304 outputs the decoded intra-prediction parameter to the prediction image generator 308, and stores the decoded intra-prediction parameter on the prediction parameter memory 307.

The reference picture memory 306 stores the block of the reference picture (reference picture block) generated by the adder 312 at a location predetermined for each picture as a decode target and for each block of the picture.

The prediction parameter memory 307 stores the prediction parameter at a location predetermined for each picture as a decode target and for each block of the picture. More specifically, the prediction parameter memory 307 stores the inter-prediction parameter decoded by the inter-prediction parameter decoding unit 303, the intra-prediction parameter decoded by the intra-prediction parameter decoding unit 304, and the prediction mode predMode separated by the entropy decoder 301. The inter-prediction parameter to be stored includes a prediction list use flag predFlagLX (inter-prediction flag inter_pred_idx), reference picture index refIdxLX, and vector mvLX.

The prediction image generator 308 receives the prediction mode predMode input via the entropy decoder 301, and the prediction parameter from the prediction parameter decoder 302. The prediction image generator 308 reads the reference picture from the reference picture memory 306. The prediction image generator 308 generates a prediction picture block P (prediction image) using the input prediction parameter and the read reference picture in the prediction mode indicated by the prediction mode predMode.

In a case that the prediction mode predMode indicates the inter-prediction mode, the inter-prediction image generating unit 309 generates the prediction picture block P through inter-prediction using the inter-prediction parameter input from the inter-prediction parameter decoding unit 303 and the read reference picture. The prediction picture block P corresponds to PU. The PU corresponds to part of a picture constructed of multiple pixels serving as a unit of prediction process, namely, a decode target block on which the prediction process is performed at a time.

The inter-prediction image generating unit 309 reads from the reference picture memory 306 the reference picture block at a location indicated by the vector mvLX with respect to the decode target block, from the reference picture indicated by the reference picture index refIdxLX on the reference picture list (L0 list or L1 list) with the prediction list use flag predFlagLX being 1. The inter-prediction image generating unit 309 predicts the prediction picture block P from the read prediction picture block to generate the prediction picture block P. The inter-prediction image generating unit 309 outputs the generated prediction picture block P to the adder 312.

The inter-prediction image generating unit 309 includes a prediction picture block decode waiting unit.

(Prediction Picture Block Decode Waiting Unit)

A prediction picture block decode waiting unit determines whether a particular CTB of the reference picture has been decoded in accordance with the parallel decoding information. If the particular CTB of the reference picture has not been decoded, the prediction picture block decode waiting unit waits on standby without generating the prediction picture block P. With the particular CTB of the reference picture decoded, the prediction picture block decode waiting unit generates the prediction picture block P. In a case that the prediction picture block P belonging to a target view i references the reference picture of the reference view j, coordinates of the particular CTB of the reference picture (xRefCtb, yRefCtb) are determined in accordance with the following formulas.

$$xRefCtb = \min(((xCtb + pdi\_unreferenced\_region\_c\text{-}tu\_horizontal[i][j]) * CtbSizeY + refCtbSizeY - 1) / refCtbSizeY - 1) * refCtbSizeY,$$
$$(refPicWidthInCtbsY * refCtbSizeY)$$

$$yRefCtb = \min(((yCtb + -(pdi\_unreferenced\_region\_c\text{-}tu\_vertical[i][j] - 1) * CtbSizeY + refCtbSizeY - 1) / refCtbSizeY - 1) * refCtbSizeY,$$
$$(refPicHeightInCtbsY * refCtbSizeY)$$

In a case that the second unreferenced region is not defined (pdi_unreferenced_region_ctu_horizontal is 0), xRefCtb is set to be as below to be a CTB at the rightmost end of the screen immediate prior to the CTB at the top left coordinates of the first unreferenced region.

$$xRefCtb = (refPicWidthInCtbsY - 1) * refCtbSizeY$$

(Modification of Prediction Picture Block Decode Waiting Unit)

The coordinates of the particular CTB may be defined by the CTB size refCtbSizeY units of the reference view rather than by pixel units (corresponding to second definition of the unreferenced region). In a case that the prediction picture block P belonging to the target view i references the reference picture of the reference view j, the coordinates of the particular CTB of the reference picture (xRefCtb, yRefCtb) are determined in accordance with the following formulas.

$$xRefCtb=\min(((xCtb+pdi\_unreferenced\_region\_ctu\_horizontal[i][j]*CtbSizeY+refCtbSizeY-1)/refCtbSizeY-1),(refPicWidthInCtbsY-1))$$

$$yRefCtb=\min(((yCtb+pdi\_unreferenced\_region\_ctu\_vertical[i][j]-1)*CtbSizeY+refCtbSizeY-1)/refCtbSizeY-1),(refPicHeightInCtbsY-1))$$

Note that xRefCtb is set as described below with pdi_unreferenced_region_ctu_horizontal being 0.

$$xRefCtb=refPicWidthInCtbsY-1$$

In a case that the prediction mode predMode indicates the intra-prediction mode, the intra-prediction image generating unit 310 performs the intra-prediction using the intra-prediction parameter input from the intra-prediction parameter decoding unit 304 and the read reference picture. More specifically, the intra-prediction image generating unit 310 reads from the reference picture memory 306, as a decode target picture, the prediction picture block within a predetermined area from a decode target block from among decoded blocks. The predetermined area is one of the adjacent blocks including a left block, a diagonally upper left block, an upper block, a diagonally upper right block in a case that the decode target block successively moves in the order of raster scan. The predetermined area is different depending on the intra-prediction mode. The order of raster scan is a sequence that proceeds from the top row to the bottom row while moving from the leftmost end to the rightmost end at each row at the same time.

The intra-prediction image generating unit 310 generates the prediction picture block by predicting the prediction picture block on the read reference picture block in the prediction mode indicated by the intra-prediction mode IntraPredMode. The intra-prediction image generating unit 310 outputs the generated prediction picture block P to the adder 312.

The dequantization and inverse DCT unit 311 dequantizes the quantization coefficient input from the entropy decoder 301, thereby determining a DCT coefficient. The dequantization and inverse DCT unit 311 performs inverse DCT (Inverse Discrete Cosine Transform) on the determined DCT coefficient, thereby calculating a decode residual signal. The dequantization and inverse DCT unit 311 outputs the calculated decode residual signal to the adder 312 and the residual memory 313.

The adder 312 sums on a per pixel basis the prediction picture block P input from the inter-prediction image generating unit 309 and the intra-prediction image generating unit 310 and the signal value of the decode residual signal input from the dequantization and inverse DCT unit 311. The adder 312 thus generates a reference picture block. The adder 312 saves the generated reference picture block on the reference picture memory 306, and outputs a decoded layered image Td into which the generated reference blocks are integrated on a per picture basis.

(Parallel Decode Operation)

Figure 7:
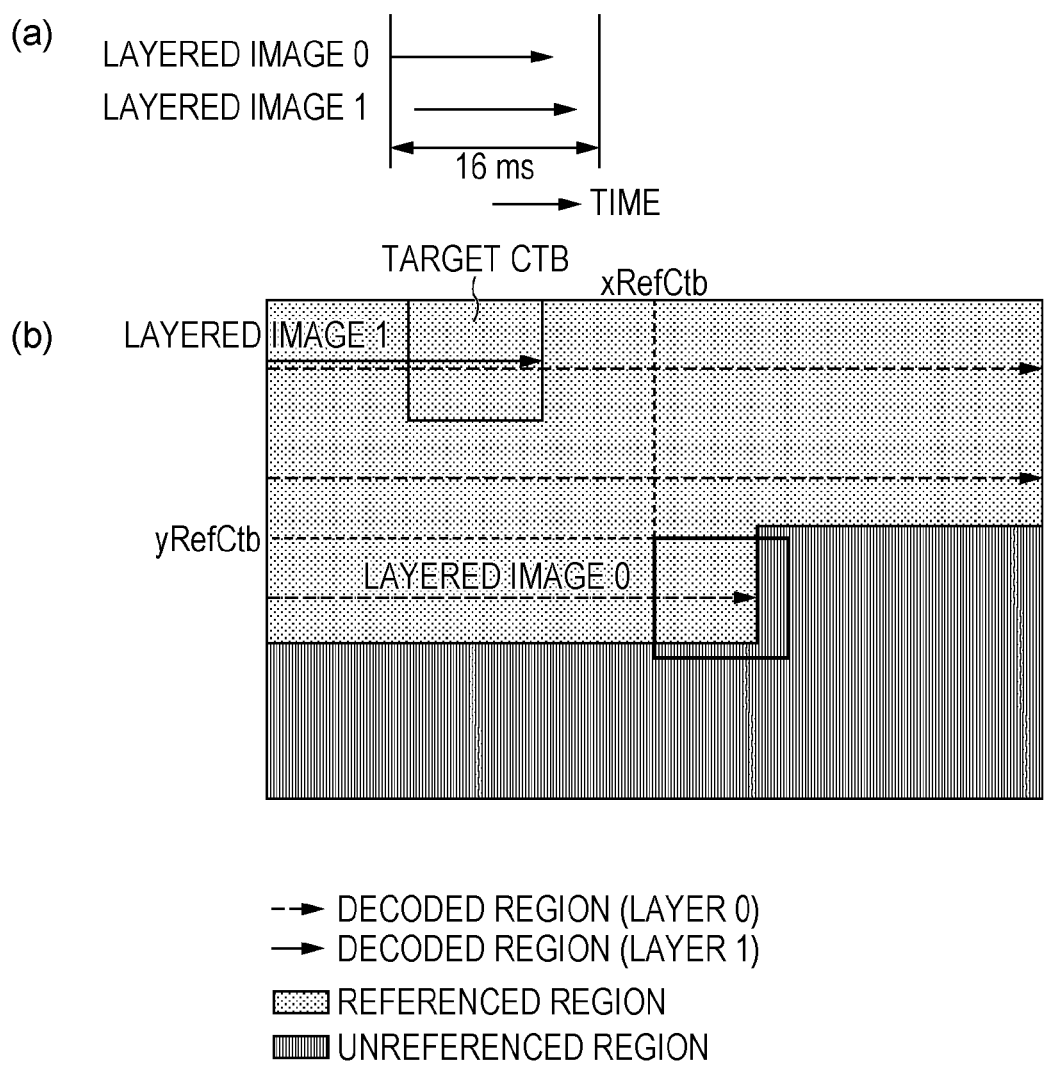
FIG. 7 illustrates the concept of a parallel decode operation of the embodiment.

FIG. 7 illustrates the concept of the parallel decode operation of the embodiment.

Referring to FIG. 7(*a*), a moving image composed of multiple layered images is decoded. In order to complete the decoding process on an apparatus, having a limited decoding speed, within a predetermined period of time (16 ms in this case), multiple layered images (layer 0 and layer 1 in this case) may be decoded in parallel. Since the layer 1 is coded depending on the layer 0 in the scalable coding, it is difficult to decode in a fully parallel fashion. In accordance with the present embodiment, by limiting the reference range by which the layer 1 references the layer 0 in the decoding on a block unit, the layer 1 may be decoded with a predetermined delay of CTB subsequent to the decoding of the layer 0.

FIG. 7(*b*) illustrates an example in which the layer 1 is decoded later than the layer 0 with a delay indicated by the parallel decoding information. Each arrow in FIG. 7(*b*) represents a region where the respective layered image is decoded. The tip of the arrow indicates the right end of a block where the decode process is currently being performed. The target CTB is a decode target in the layer 1. In the decode process of the target CTB in the layer 1, a light-shadowed portion represents a referenced region that may be referenced in an area of an image of the layer 0 where the decode process is performed. A thickly-shadowed portion represents an unreferenced region. In order to decode the target CTB, the prediction picture block decode waiting unit determines whether the particular CTB indicated by the coordinates (xRefCtb, yRefCtb) of the image of the layer 0 has been decoded. If the particular CTB has not been decoded, the prediction picture block decode waiting unit waits on standby for the decoding of the target CTB. After the particular CTB is decoded, the prediction picture block decode waiting unit starts decoding the target CTB.

By using the pdi_offset_flag, the image decoding apparatus thus configured limits the referenced region in response to whether the loop filter is related to the target view. If the loop filter is not related, the parallel decoding (ultra low latency decoding) is performed with only a delay of one CTB. In this way, the degree of parallelism of the decoding process increases, thereby shortening the process time.

(Configuration of Image Coding Apparatus)

Figure 8:
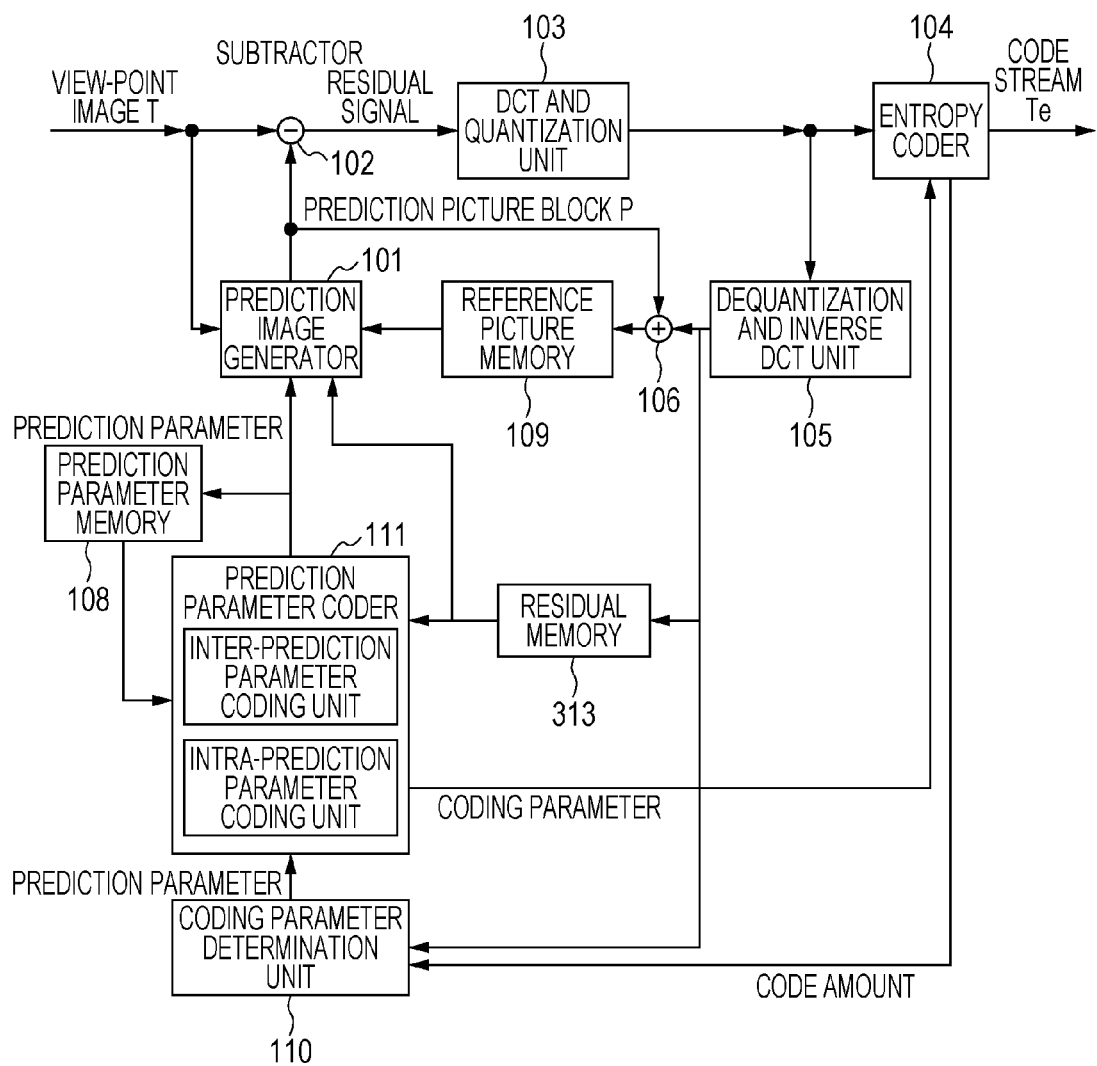
FIG. 8 is a block diagram illustrating the configuration of the image decoding apparatus of the embodiment.

The configuration of an image coding apparatus 11 of the present embodiment is described below. FIG. 8 is a block diagram illustrating the configuration of the image decoding apparatus 11 of the embodiment. The image coding apparatus 11 includes a prediction image generator 101, a subtractor 102, a DCT and quantization unit 103, an entropy coder 104, a dequantization and inverse DCT unit 105, an adder 106, a prediction parameter memory (prediction parameter storage unit and frame memory) 108, a reference picture memory (reference image storage unit and frame memory) 109, a coding parameter determination unit 110, a prediction parameter coder 111, and a residual memory 313 (residual recorder). The prediction parameter coder 111 includes an inter-prediction parameter coding unit 112, and an intra-prediction parameter coding unit 113.

The prediction image generator 101 generates the prediction picture block P on each of the blocks into which the picture of the layered image T input from the outside at each view point is partitioned. The prediction image generator 101 reads the prediction picture block from the reference picture memory 109 in accordance with the prediction parameter input from the prediction parameter coder 111. The prediction parameter input from the prediction parameter coder 111 is a motion vector or a displacement vector, for example. The prediction image generator 101 reads the reference picture block of a block at a location indicated by the motion vector or the displacement vector predicted from the coding target block as a start point. The prediction image generator 101 generates the prediction picture block P in response to the read reference picture block using one of the prediction methods. The prediction image generator 101 outputs the generated prediction picture block P to the subtractor 102. Since the prediction image generator 101 operates in the same way as the above-described prediction image generator 308, the detailed description of the generation of the prediction picture block P is omitted herein.

The prediction image generator 101 selects the prediction method that minimizes an error value responsive to a difference between the signal value of each pixel in the block included in the layered image and the signal value of the corresponding pixel in the prediction picture block P. Selecting the prediction method is not limited to this method.

If the picture as a coding target is a base view picture, the multiple prediction methods include the intra-prediction, motion prediction, and merge prediction. The motion prediction is prediction of display time intervals from among the inter-predictions. The merge prediction uses the reference picture block identical to a coded block within a predetermined range from a coding target block and the prediction parameter. In a case that the picture as a coding target is a non-base view picture, the multiple predictions include the intra-prediction, the motion prediction, the merge prediction, and displacement prediction. The displacement prediction (parallax prediction) is a prediction between different layered images (different view-point images) of the inter-predictions.

With the intra-prediction selected, the prediction image generator 101 outputs to the prediction parameter coder 111 the prediction mode predMode indicating the intra-prediction mode that has been used to generate the prediction picture block P.

With the motion prediction selected, the prediction image generator 101 saves on the prediction parameter memory 108 a motion vector mvLX that has been used to generate the prediction picture block P, and outputs the motion vector mvLX to the inter-prediction parameter coding unit 112. The motion vector mvLX is a vector extending from the location of the coding target block to the reference picture block used to generate the prediction picture block P. The motion vector mvLX includes information indicating the reference picture (for example, a reference picture index refIdxLX, and a picture order number POC), and may represent a prediction parameter. The prediction image generator 101 outputs to the prediction parameter coder 111 the prediction mode predMode indicating the inter-prediction mode.

With the displacement prediction selected, the prediction image generator 101 saves on the prediction parameter memory 108 the displacement vector that has been used to generate the prediction picture block P, and outputs the displacement vector to the inter-prediction parameter coding unit 112. The displacement vector dvLX is a vector extending from the location of the coding target block to the location of the reference picture block that is used to generate the prediction picture block P. The displacement vector dvLX includes information indicating a reference picture (such as the reference picture index refIdxLX, and view ID view_id), and may represent a prediction parameter. The prediction image generator 101 outputs to the prediction parameter coder 111 the prediction mode predMode indicating the inter-prediction mode.

With the merge prediction selected, the prediction image generator 101 outputs to the inter-prediction parameter coding unit 112 a merge index merge_idx indicating the selected reference picture block. Also, the prediction image generator 101 outputs to the prediction parameter coder 111 the prediction mode predMode indicating the merge prediction mode.

On each pixel, the subtractor 102 subtracts the signal value of the prediction picture block P input from the prediction image generator 101 from the signal value of the block corresponding to the layered image T input from the outside, and thus generates a residual signal. The subtractor 102 outputs the residual signal to the DCT and quantization unit 103 and the coding parameter determination unit 110.

The DCT and quantization unit 103 performs DCT on a residual signal input from the subtractor 102, thereby calculating a DCT coefficient. The DCT and quantization unit 103 determines a quantization coefficient by quantizing the calculated DCT coefficient. The DCT and quantization unit 103 outputs the determined quantization coefficient to the entropy coder 104 and the dequantization and inverse DCT unit 105.

The entropy coder 104 receives the quantization coefficient from the DCT and quantization unit 103, and the coding parameter from the coding parameter determination unit 110. The input coding parameters include codes, such as a reference picture index refIdxLX, a vector index mvp_LX_idx, a difference vector mvdLX, a prediction mode predMode, and a merge index merge_idx.

The entropy coder 104 entropy-codes the input quantization coefficient and coding parameter, thereby generating the code stream Te. The entropy coder 104 outputs the generated code stream Te to the outside. The entropy coder 104 includes an SEI coding unit. The SEI coding unit codes the parallel decoding information. Coded parallel decoding information is included in the code stream Te.

The dequantization and inverse DCT unit 105 dequantizes the quantization coefficient input from the DCT and quantization unit 103, thereby determining a DCT coefficient. The dequantization and inverse DCT unit 105 performs inverse-DCT on the determined DCT coefficient to calculate a decode residual signal. The dequantization and inverse DCT unit 105 outputs the calculated decode residual signal to the adder 106.

On a per pixel basis, the adder 106 sums the signal value of the prediction picture block P input from the prediction image generator 101 and the signal value of the decode residual signal input from the dequantization and inverse DCT unit 105 in order to generates a reference picture block. The adder 106 saves the generated reference picture block on the reference picture memory 109.

The prediction parameter memory 108 saves the prediction parameter generated by the prediction parameter coder 111 at a location determined on a picture as a coding target and on a block.

The reference picture memory 109 saves the reference picture block generated by the adder 106 at a location determined on a picture as a coding target and on a block.

The coding parameter determination unit 110 selects a set from among multiple sets of coding parameters. The coding parameter includes the prediction parameter and the parameter that becomes a coding target that is generated in relation to the prediction parameter. Using each set of these coding parameters, the prediction image generator 101 generates the prediction picture block P. The coding parameter determination unit 110 includes a prediction parameter limiting unit.

The coding parameter determination unit 110 calculates a cost value indicating a size of information of each of the multiple sets and a coding error. The cost value is the sum of a code amount and a value resulting from multiplying a square error by a coefficient $\lambda$. The code amount is the size of information of the code stream Te that is obtained by entropy-coding a quantization error and a coding parameter. The square error is the sum of the square values of the residual signals calculated by the subtractor 102 between pixels. The coefficient $\lambda$ is a preset real number greater than zero. The coding parameter determination unit 110 selects a set of coding parameters that minimizes the calculated cost value. In this way, the entropy coder 104 outputs the selected set of coding parameters as the code stream Te, but does not output the unselected sets of coding parameters. The prediction parameter limiting unit determines whether the prediction parameters in the coding parameters serving as a selection candidate exceeds a range limit. More specifically, the prediction parameter may specify the reference view j as a reference destination of the target view i. In accordance with the parallel decoding information coded by the SEI coding unit, the prediction parameter limiting unit determines whether the motion vector mvLX included in the prediction parameter exceeds a predetermined range. This determination is performed such that the reference region indicated by the unreferenced region [i][j] is not referenced.

The prediction parameter limiting unit determines as described below whether the first unreferenced region is included or not.

$$mvLX[1] > pdi\_unreferenced\_region\_ctu\_vertical * CtbizeY - PdiOffsetVal - 4$$

Where "4" means that a reduction of four pixels in region is introduced because with a motion compensation filter being an eight-tap filter, a pixel separated from a target pixel by four pixels is referenced for motion compensation.

If the above formula holds true, the first unreferenced region is referenced. In other words, the prediction parameter exceeds the range limit.

The limitation may be varied depending on whether the motion compensation is performed by the motion compensation filter, in other words, depending on whether the motion vector is a vector pointing to the location of an integer number. More specifically, if the motion vector is at ¼ pel accuracy level with mvLX[1] being a multiple of 4, the following formula may be used as a determination formula.

$$mvLX[1] > pdi\_unreferenced\_region\_ctu\_vertical * CtbizeY - PdiOffsetVal$$

In other cases, the following formula may be used as the determination formula.

$$mvLX[1] > pdi\_unreferenced\_region\_ctu\_vertical * CtbizeY - PdiOffsetVal - 4$$

Similarly, the prediction parameter limiting unit determines in accordance with the following formula whether the second unreferenced region is included or not.

$$mvLX[0] > pdi\_unreferenced\_region\_ctu\_horizontal * CtbSizeY - PdiOffsetVal - 4$$

If the above formula holds true, the second unreferenced region is referenced, in other words, the prediction parameter exceeds the range limit. With pdi_unreferenced_region_ctu_horizontal being 0, the determination as to whether the second unreferenced region is included is not performed.

In the same manner as with the first unreferenced region, the limitation may be varied depending on whether the motion vector is a vector pointing to the location of an integer number. More specifically, if the motion vector is at ¼ pel accuracy level with mvLX[1] being a multiple of 4, the following formula may be used as the determination formula.

$$mvLX[0] > pdi\_unreferenced\_region\_ctu\_horizontal * CtbizeY - PdiOffsetVal$$

In other cases, the following formula may be used as the determination formula.

$$mvLX[0] > pdi\_unreferenced\_region\_ctu\_horizontal * CtbizeY - PdiOffsetVal - 4$$

The coding parameter determination unit 110 excludes a prediction parameter above the range limit as a selection candidate, and does not output such a parameter as a coding parameter after all. Conversely, the coding parameter determination unit 110 selects a coding parameter from the prediction parameter not above the range limit.

The prediction parameter coder 111 derives the prediction parameter to be used to generate a prediction picture, based on the parameter input from the prediction image generator 101, and codes the derived prediction parameter to generate a set of coding parameters. The prediction parameter coder 111 outputs the set of generated coding parameters to the entropy coder 104.

The prediction parameter coder 111 saves on the prediction parameter memory 108 the prediction parameter corresponding to the coding parameter selected by the coding parameter determination unit 110 from among the set of generated coding parameters.

The prediction parameter coder 111 causes the inter-prediction parameter coding unit 112 to operate in a case that the prediction mode predMode input from the prediction image generator 101 indicates an inter-prediction mode. The prediction parameter coder 111 causes the intra-prediction parameter coding unit 113 to operate in a case that the prediction mode predMode indicates an intra-prediction mode.

The inter-prediction parameter coding unit 112 derives an inter-prediction parameter based on the prediction parameter input from the coding parameter determination unit 110. The inter-prediction parameter coding unit 112 has the same configuration as the configuration of the inter-prediction parameter decoding unit 303 configured to derive the inter-prediction parameter (see FIG. 6 and other figures). The configuration of the inter-prediction parameter coding unit 112 is described below.

The intra-prediction parameter coding unit 113 determines as a set of inter-prediction parameters the intra-prediction mode IntraPredMode indicated by the prediction mode predMode input from the coding parameter determination unit 110.

According to NPL 1, a difference in the CTB size between the target view and the reference view needs to be accounted for in the determination as to whether the unreferenced region is referenced. In accordance with the present embodiment, the image coding apparatus references only the CTB size of the target view in the determination formula, and does not depend on the parameter of the reference view. In this way, the determination process is simplified.

Since the range limit is defined only in the vertical direction with pdi_unreferenced_region_ctu_horizontal being 0, the image coding apparatus is free from the determination as to whether the prediction parameter references the first unreferenced region. The determination process is thus simplified.

Second Embodiment

A second embodiment is described below.

The structure of the code data of the parallel decoding information of the second embodiment is identical to the structure of the code data of FIG. 3. The second embodiment is different from the first embodiment in that the syntax elements pdi_unreferenced_region_ctu_vertical and pdi_unreferenced_region_ctu_horizontal as the offsets indicating the unreferenced regions are set with respect to the CTB size refCtbSizeY of the reference view. Along with this, the second embodiment is different from the first embodiment in the setting method of the unreferenced region.

(Third Definition of Unreferenced Region)

The offset indicating the unreferenced region may be specified in CTB size refCtbSizeY units of the reference image. Modification C that specifies the offset in CTB size refCtbSizeY units of the reference image is described below.

The CTB coordinates refCtbAddrx and refCtbAddrY on the reference view are defined by the formulas below.

refCtbAddrX=(CtbAddrInRS % PicWidthInCtbsY)*
CtbSizeY/refCtbSizeY)

refCtbAddrY=(CtbAddrInRS/PicWidthInCtbsY)*
CtbSizeY/refCtbSizeY)

The CTB coordinates (CtbAddrInRS % PicWidthInCtbsY, CtbAddrInRS/PicWidthInCtbsY) are derived from the CTB address CtbAddrInRs of the target block and the screen size PicWidthInCtbsY of the CTB size of the target view. The resulting CTB coordinates are multiplied by the CTB size CtbSizeY of the target view, and then divided by the CTB size refCtbSizeY of the reference view. The CTB coordinates refCtbAddrX and refCtbAddrY thus result. In a case that the CTB size CtbSizeY of the target view is larger than the CTB size refCtbSizeY of the reference view, CtbSizeY/refCtbSizeY becomes greater than 1. As a result, the CTB coordinates refCtbAddrX and refCtbAddrY on the reference view are greater than the CTB coordinates of the target view.

With pdi_unreferenced_region_ctu_vertical being 0, the first unreferenced region is not defined. With pdi_unreferenced_region_ctu_vertical greater than 0, the first unreferenced region is defined as described below.

xUnref=0..pic_width_in_luma_samples-1, yUnref=yCtb+(pdi_unreferenced_region_ctu_vertical
[i][j]*CtbSizeY)-PdiOffsetVal..pic_height_in_
luma_samples-1, yCtb=refCtbAddrY*refCtbSizeY With pdi_unreferenced_region_ctu_horizontal being 0, the second unreferenced region is not defined. With pdi_unreferenced_region_ctu_horizontal greater than 0, the second unreferenced region is defined as below.

xUnref=xCtb+(pdi_unreferenced_region_ctu_horizontal[i][j]*refCtbSizeY)-PdiOffset-
Val..pic_width_in_luma_samples-1, yUnref=yCtb+((pdi_unreferenced_region_ctu_vertical
[i][j]-1)*refCtbSizeY)-PdiOffsetVal..pic_height_ in_luma_samples-1, xCtb=refCtbAddrX*refCtbSizeY, yCtb=refCtbAddrY*refCtbSizeY (Fourth Definition of Unreferenced Region)

With PdiOffsetVal being 0, the unreferenced region may be defined in the CTB size refCtbSizeY units of the reference view rather than in pixel units.

The CTB coordinates refCtbAddrX and refCtbAddrY on the reference view are defined in the formulas as below.

refCtbAddrX=(CtbAddrInRS % PicWidthInCtbsY)*
CtbSizeY/refCtbSizeY)

refCtbAddrY=(CtbAddrInRs/PicWidthInCtbsY)*
CtbSizeY/refCtbSizeY)

With pdi_unreferenced_region_ctu_vertical being 0, the first unreferenced region is not defined. With pdi_unreferenced_region_ctu_vertical greater than 0, the first unreferenced region is defined as below.

xUnrefCtb=0..PicWidthInCtbsY-1 yUnrefCtb=refCtbAddrY+(pdi_unreferenced_region_ctu_vertical[i][j])..PicHeightInCtbsY-1

In a case that an image is scanned in the CTB units in the order of raster scan, the first unreferenced region may be expressed by the CTB address refCtbAddr of a starting CTB as a CTB that is accessed first in the first unreferenced region. In such a case, the CTBs having the CTB address refCtbAddr of the starting CTB and the CTBs subsequent thereto, from among the CTBs within the image, are all included in the first unreferenced region. The CTB address refCtbAddr of the starting CTB is defined as below.

refCtbAddr=(refCtbAddrY+pdi_unrference-
d_region_ctu_vertical[i][j])*refPicWidthInCtbsY The first unreferenced region is a rectangular area defined by the vertical offset pdi_unreferenced_region_ctu_vertical [i][j]. The starting CTB address of the first unreferenced region is defined by a value that results from multiplying the sum of the Y coordinate refCtbAddrY of the reference CTB address and the vertical offset by the CTB width refPicWidthInCtbs of the reference picture. The Y coordinate refCtbAddrY of the reference CTB address is defined by a value that results from dividing the product of the Y coordinate YCtb of the CTB coordinates of the target block and the CTB size CtbSizeY of the target picture by the CTB size refCtbSizeY of the reference picture.

With pdi_unreferenced_region_ctu_horizontal being zero, the second unreferenced region is not defined. With pdi_unreferenced_region_ctu_horizontal greater than 0, the second unreferenced region is defined as described below.

xUnrefCtb=refCtbAddrX+(pdi_unreference-
d_region_ctu_horizontal[i][j])..PicHeightInCtbsY-1 yUnrefCtb=refCtbAddrY+((pdi_unreference-
d_region_ctu_vertical[i][j]-1))..PicHeightInCtbsY-1

In a case that an image is scanned in the CTB units in the order of raster scan, the unreferenced region may be expressed by the CTB address refCtbAddr of a starting CTB as a CTB that is accessed first in the second unreferenced region. In such a case, the CTBs having the CTB address refCtbAddr of the starting CTB and the CTBs subsequent thereto, from among the CTBs within the image, are all included in the unreferenced region. The CTB address refCtbAddr of the starting CTB is defined as below.

refCtbAddr=(refCtbAddrY+pdi_unreference-
d_region_ctu_vertical[i][j]-1)refPicWidthInCtbsY+min(refCtbAddrX+pdi_unreference-
d_region_ctu_horizontal[i][j],
refPicWidthInCtbsY-1)

The second unreferenced region is an area defined by the vertical offset pdi_unreferenced_region_ctu_vertical[i][j] and the horizontal offset pdi_unreferenced_region_ctu_horizontal[i][j]. The starting CTB address of the second unreferenced region is calculated as below. The value that results from subtracting 1 from the sum of the Y coordinate refCtbAddrY of the reference CTB address and the vertical offset is multiplied by the CTB width refPicWidthInCtbs of the reference picture. The resulting product is added to the sum of the X coordinate refCtbAddrX of the reference CTB address and the horizontal offset. The total sum is further added to a minimum value that results from subtracting 1 from the CTB width refPicWidthInCtb of the reference picture. The resulting value is the starting CTB address of the second unreferenced region. The Y coordinate refCtbAddrY of the reference CTB address is defined by a value that results from multiplying the Y coordinate yCtb of the CTB coordinates of the target block by the CTB size CtbSizeY of the target picture, and dividing the resulting product by the CTB size refCtbSizeY of the reference picture. The X coordinate refCtbAddrX of the reference CTB address is defined by a value that results from multiplying the X coordinate xCtb of the CTB coordinates of the target block by the CTB size CtbSizeY of the target picture and dividing the resulting product by the CTB size refCtbSizeY of the reference picture.

An image decoding apparatus 31B of the embodiment is different from the image decoding apparatus 31 in that the inter-prediction image generating unit 309 includes a prediction picture decode waiting unit B instead of the prediction picture block decode waiting unit.

(Prediction Picture Block Decode Waiting Unit B)

The prediction picture decode waiting unit B is different from the prediction picture block decode waiting unit in the derivation method of the coordinates (xRefCtb, yRefCtb) of a particular CTB. In a case that the prediction picture block P belonging to the target view i references the reference picture of the reference view j, the coordinates (xRefCtb, yRefCtb) of a particular CTB of the reference picture are derived in accordance with the following formulas.

$$xRefCtb=\min(((xCtb+pdi\_unreferenced\_region\_ctu\_horizontal[i][j])*refCtbSizeY,(pic\_width\_in\_luma\_samples-1)/refCtbSizeY*refCtbSizeY)$$

$$yRefCtb=\min(((yCtb+pdi\_unreferenced\_region\_ctu\_vertical[i][j]-1)refCtbSizeY,(pic\_height\_in\_luma\_samples-1)/refCtbSizeY*refCtbSizeY)$$

With pdi_unreferenced_region_ctu_horizontal being 0, however, xRefCtb is set as described below.

$$xRefCtb=(refPicWidthInCtbsY-1)*refCtbSizeY$$

(Modification of Prediction Picture Block Decode Waiting Unit B)

The coordinates of the particular CTB may be defined in the CTB size refCtbSizeY units of the reference view rather than in pixel units. In order for the prediction picture block P belonging to the target view to reference the reference view j, the coordinates (xRefCtb, yRefCtb) of the particular CTB of the reference picture are derived in the formulas described below.

$$xRefCtb=\min(((xCtb+pdi\_unreferenced\_region\_ctu\_horizontal[i][j],(refPicWidthInCtbsY-1))$$

$$yRefCtb=\min(((yCtb+(pdi\_unreferenced\_region\_ctu\_vertical[i][j]-1),(refPicHeightInCtbsY-1))$$

With pdi_unreferenced_region_ctu_horizontal being 0, xRefCtb is set as described below.

$$xRefCtb=refPicWidthInCtbsY-1$$

The image decoding apparatus 31B sets the unit of pdi_unreferenced_region_ctu_horizontal[i][j] and pdi_unreferenced_region_ctu_vertical[i][j] to be the CTB size of the reference view. In this way, the derivation process of the coordinates of a particular CTB is simplified.

(Configuration of Image Coding Apparatus)

The difference between an image coding apparatus 11B of the embodiment and the image coding apparatus 11 is that the coding parameter determination unit 110 in the image coding apparatus 11B includes a prediction parameter limiting unit B instead of the prediction parameter limiting unit in the image coding apparatus 11.

(Prediction Parameter Limiting Unit B)

The prediction parameter limiting unit B is different from the prediction parameter limiting unit in the determination method as to whether the prediction parameter references the unreferenced region.

As described below, the prediction parameter limiting unit B determines whether the first unreferenced region is included or not.

$$mvLX[1]>pdi\_unreferenced\_region\_ctu\_vertical*refCtbizeY-PdiOffsetVal-dy$$

$$dy=((CtbAddrInRs/PicWidthInCtbsY)*CtbSizeY)\%\ refCtbSizeY$$

With the above formulas holding true, the first unreferenced region is referenced. More specifically, the prediction parameter exceeds the range limit.

Similarly, as described below, the prediction parameter limiting unit determines whether the second unreferenced region is included.

$$mvLX[0]>pdi\_unreferenced\_region\_ctu\_horizontal*refCtSizeY-PdiOffsetVal-dx$$

$$dx=((CtbAddrInRs\ \%\ PicWidthInCtbsY)*CtbSizeY)\ \%\ refCtbSizeY$$

With the above formulas holding true, the second unreferenced region is referenced. More specifically, the prediction parameter exceeds the range limit. With pdi_unreferenced_region_ctu_horizontal being 0, however, the determination as to whether the second unreferenced region is included is not performed.

Part of the image coding apparatus 11 and the image decoding apparatus 31 of the embodiment may be implemented by a computer. For example, the computer may implement the entropy decoder 301, the prediction parameter decoder 302, the prediction image generator 101, the DCT and quantization unit 103, the entropy coder 104, the dequantization and inverse DCT unit 105, the coding parameter determination unit 110, the prediction parameter coder 111, the entropy decoder 301, the prediction parameter decoder 302, the prediction image generator 308, and the dequantization and inverse DCT unit 311. In such a case, the image coding apparatus 11 or the image decoding apparatus 31 may be implemented by recording a program implementing the control function thereof on a computer-readable recording medium, causing a computer system to read the program from the recording medium, and then to execute the program. The term "computer system" is a computer system built in the image coding apparatus 11 or 11B, or the image decoding apparatus 31 or 31B, and includes OS and hardware such as peripheral devices. The "computer-readable recording medium" refers to a movable medium, such as a flexible disk, a magneto-optical disk, ROM, or CD-ROM, and a storage device built in the computer system, such as a hard disk. The "computer-readable recording medium" may include an entity, storing dynamically the program for a short period of time, such as a communication line that transmits the program via a communication network, like a network such as the Internet or a telephone network. The "computer-readable recording medium" may also include an entity, storing the program for a predetermined period of time, such as a volatile memory in the computer system that serves as a server or a client. The program may implement part of the above-described function, and may implement the function in cooperation with a program recorded on the computer system.

Whole or part of the image coding apparatus 11 or the image decoding apparatus 31 may be implemented using an integrated circuit, such as LSI (Large Scale Integration). The functional blocks of the image coding apparatus 11 or the image decoding apparatus 31 may be individually incorporated into processors. Whole or part of the functional blocks may be integrated and then incorporated into a processor. The integration is not limited to LSI. A dedicated circuit or a general-purpose processor may be used. A new integration technique substituting for the LSI may become available with the advance of the semiconductor technology. An integrated circuit developed with such a new integration technique may also be used.

The embodiment of the present invention has been described in detail with reference to the drawings. The present invention is not limited to the above-described specific configuration. A variety of changes and modifications are possible without departing the scope of the present invention.

(Summary)

The present invention has at least the following features as described below in the description.

(1) The present invention has been developed to solve the previously described problem. One aspect of the present invention relates to a code data structure including an offset in a vertical direction and an offset in a horizontal direction. A first unreferenced region is defined as a rectangular shape by the vertical offset, and a second unreferenced region is defined by the horizontal offset.

(2) In the code data structure according to another aspect of the present invention, the Y coordinate at the top left coordinates of the first unreferenced region is a value that results from multiplying the sum of the Y coordinate Yctb of the CTB coordinates of the target block and the vertical offset by the CTB size CtbSizeY, the X coordinate of the top left coordinates is 0, and the bottom right coordinates of the unreferenced region is at the bottom right of the screen.

(3) In the code data structure according another aspect of the present invention, the Y coordinate of the top left coordinates of the second unreferenced region is determined by subtracting 1 from the sum of the Y coordinate yCtb of the CTB coordinates of the target block and the offset in the vertical direction, and by multiplying the resulting difference by the CTB size CtbSizeY. The X coordinate of the top left coordinates is determined by multiplying the sum of the X coordinate xCtb of the CTB coordinates of the target block and the offset in the vertical direction by the CTB size CtbSizeY.

(4) In the code data structure according another aspect of the present invention, the code data includes an adjustment flag indicating an adjustment for the loop filter. The coordinates of the first unreferenced region and the second unreferenced region change by a predetermined value in response to the adjustment flag.

(5) In the code data structure according another aspect of the present invention, the starting CTB address of the first unreferenced region is defined by a value that results from multiplying the sum of the Y coordinate refCtbAddrY of the reference CTB address and the offset in the vertical direction by the CTB width refPicWidthInCtbs of the reference picture. The Y coordinate refCtbAddrY of the reference CTB address is defined by a value that results from dividing the product of the Y coordinate yCtb of the CTB coordinates of the target block and the CTB size CtbSizeY of the target picture by the CTB size refCtbSizeY of the reference picture.

(6) In the code data structure according another aspect of the present invention, the starting CTB address of the second unreferenced region is determined by multiplying a value, which results from subtracting 1 from the sum of the Y coordinate refCtbAddrY of the reference CTB address and the offset in the vertical direction, by the CTB width refPicWidthInCtbs of the reference picture, and by summing the resulting value, the sum of the X coordinate refCtbAddrX of the reference CTB address and the offset in the horizontal direction, and the minimum value that is obtained by subtracting 1 from the CTB width refPicWidthInCtb of the reference picture. The Y coordinate refCtbAddrY of the reference CTB address is defined by a value that results from dividing the product of the Y coordinate yCtb of the CTB coordinates of the target block and the CTB size CtbSizeY of the target picture by the CTB size refCtbSizeY of the reference picture. The X coordinate refCtbAddrX of the reference CTB address is defined by a value that results from dividing the product of the X coordinate xCtb of the CTB coordinates of the target block and the CTB size CtbSizeY of the target picture by the CTB size refCtbSize Y of the CTB size of the reference picture.

(7) There is provided in an image decoding apparatus. The image decoding apparatus decoding multiple layered images, includes an SEI decoder that decodes the parallel decoding information indicating the unreferenced region of a second layered image in a case that the second layered image, different from a first layered image, is referenced during decoding of the first layered image. The unreferenced region includes the first unreferenced region and the second unreferenced region.

(8) According another aspect of the present invention, the image decoding apparatus includes a prediction picture block decode waiting unit that identifies a block of the second layered image from the parallel decoding information, and causes the decoding process of the first layered image to wait on standby until the decoding of the block has been completed.

(9) According another aspect of the present invention, the image decoding apparatus includes a prediction picture block decode waiting unit that sets the X coordinate of the block to be a predetermined value in a case that the first unreferenced region is not defined as the parallel decoding information.

(10) According to another aspect of the present invention, the image decoding apparatus includes an SEI decoder that decodes the parallel decoding information including an adjustment flag indicating an adjustment for a loop filter, and a prediction picture block decode waiting unit that identifies a block of the first layered image using the adjustment flag.

(11) According to another aspect of the present invention, there is provided an image coding apparatus. The image coding apparatus includes an SEI coder that codes parallel decoding information that defines an unreferenced region that is disabled to be referenced between a first layered image and a second layered image different from the first layered image, by separating the unreferenced region into a first unreferenced region and a second unreferenced region, a prediction parameter limiting unit that determines whether a prediction parameter references the unreferenced region, and a prediction parameter determination unit that excludes from candidates a prediction parameter that is determined to reference the unreferenced region.

INDUSTRIAL APPLICABILITY

The present invention is appropriately applicable to an image decoding apparatus that decodes code data into which image data is coded, and an image coding apparatus that generates code data into which image data is coded. The present invention is also appropriately applicable to a data structure of code data that is generated by the image coding apparatus and referenced by the image decoding apparatus.

REFERENCE SIGNS LIST

1 . . . Image transmission system
11 . . . Image coding apparatus
11B . . . Image coding apparatus
101 . . . Prediction image generator
102 . . . Subtractor
103 . . . DCT and quantization unit
104 . . . Entropy coder
105 . . . Dequantization and inverse DCT unit
106 . . . Adder
108 . . . Prediction parameter memory (frame memory)
109 . . . Reference picture memory (frame memory)
110 . . . Coding parameter determination unit
111 . . . Prediction parameter coder
112 . . . Inter-prediction parameter coding unit
113 . . . Intra-prediction parameter coding unit
21 . . . Network
31 . . . Image decoding apparatus
31B . . . Image decoding apparatus
301 . . . Entropy decoder
302 . . . Prediction parameter decoder
303 . . . Inter-prediction parameter decoding unit
304 . . . Intra-prediction parameter decoding unit
306 . . . Reference picture memory (frame memory)
307 . . . Prediction parameter memory (frame memory)
308 . . . Prediction image generator
309 . . . Inter-prediction image generating unit
310 . . . Intra-prediction image generating unit
311 . . . Dequantization and inverse DCT unit
312 . . . Adder
41 . . . Image display apparatus

The invention claimed is:

1. An image decoding apparatus decoding a plurality of layered images, comprising an entropy decoder that decodes an offset in a horizontal direction and an offset in a vertical direction, indicating an unreferenced region in a case that a target layer references a reference layer; and an inter-prediction image generator that generates a prediction picture block from a reference picture, wherein in a case that the inter-prediction image generator references the reference picture of the reference layer, the unreferenced region is defined only by the offset in the vertical direction.

* * * * *